(12) United States Patent
Agarwal et al.

(10) Patent No.: US 7,282,666 B2
(45) Date of Patent: Oct. 16, 2007

(54) METHOD AND APPARATUS TO INCREASE THROUGHPUT OF PROCESSING USING PULSED RADIATION SOURCES

(75) Inventors: Vishnu K. Agarwal, Boise, ID (US); William A. Stanton, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 174 days.

(21) Appl. No.: 10/841,857

(22) Filed: May 7, 2004

(65) Prior Publication Data

US 2005/0247683 A1  Nov. 10, 2005

(51) Int. Cl.
    *B23K 26/067* (2006.01)
(52) U.S. Cl. ............................. 219/121.76; 219/121.73
(58) Field of Classification Search ........... 219/121.73, 219/121.76; 372/70; 378/34
    See application file for complete search history.

(56) References Cited

U.S. PATENT DOCUMENTS

| | | | | |
|---|---|---|---|---|
| 3,496,487 | A * | 2/1970 | McFarland et al. ........... | 372/11 |
| 4,773,073 | A * | 9/1988 | Warner et al. ................. | 372/25 |
| 5,009,486 | A * | 4/1991 | Dobrowolski et al. ....... | 359/580 |
| 5,305,334 | A * | 4/1994 | Margalit et al. ............... | 372/12 |
| 5,559,338 | A | 9/1996 | Elliott et al. | |
| 5,631,737 | A * | 5/1997 | White, III ..................... | 372/12 |
| 5,878,068 | A * | 3/1999 | Mitarai et al. ......... | 219/121.61 |
| 5,986,742 | A | 11/1999 | Straaijer et al. | |
| 6,088,379 | A | 7/2000 | Owa et al. | |
| 6,160,832 | A | 12/2000 | Kleinschmidt et al. | |
| 6,229,639 | B1 | 5/2001 | Ozarski et al. | |
| 6,252,650 | B1 | 6/2001 | Nakamura | |
| 6,396,856 | B1 * | 5/2002 | Sucha et al. .................. | 372/30 |
| 6,472,295 | B1 * | 10/2002 | Morris et al. ............... | 438/463 |
| 6,618,403 | B2 | 9/2003 | Stamm et al. | |
| 6,621,044 | B2 | 9/2003 | Jain et al. | |
| 6,850,313 | B2 * | 2/2005 | Ishikawa et al. .............. | 355/67 |
| 6,879,617 | B2 * | 4/2005 | Ariga et al. ................... | 372/55 |

(Continued)

FOREIGN PATENT DOCUMENTS

JP          9-148658  A  *  6/1997

OTHER PUBLICATIONS

Duffy et al., "Next Generation 193 nm Laser for Sub 100 nm Lithography," San Diego, CA, Date Unknown, 7 pages.

(Continued)

*Primary Examiner*—Geoffrey S. Evans
(74) *Attorney, Agent, or Firm*—TraskBritt

(57) ABSTRACT

A material processing system and method is disclosed for processing materials such as amorphous silicon in an annealing processes and lithography processes on a silicon wafer, as well as ablation processes. A first laser generates periodic pulses of radiation along a beam path directed at the target material. Similarly, at least one additional laser generates periodic pulses. A beam aligner redirects the beam path of the at least one laser, such that the beam from the at least one additional laser is directed at the target along a path colinear with the first laser's beam path. As a result, all the lasers are directed at the target along the same combined beam path. The periodic pulses of the at least one additional laser are delayed relative to the first laser such that multiple pulses impinge on the target within a single pulse cycle of any given laser.

67 Claims, 3 Drawing Sheets

U.S. PATENT DOCUMENTS

| | | |
|---|---|---|
| 2002/0000426 A1* | 1/2002 | Mead et al. ............ 219/121.76 |
| 2002/0023901 A1* | 2/2002 | Smart .................... 219/121.69 |
| 2002/0085606 A1* | 7/2002 | Ness et al. .................... 372/55 |
| 2002/0097761 A1* | 7/2002 | Sucha et al. ................... 372/30 |
| 2002/0167581 A1* | 11/2002 | Cordingley et al. ........ 347/173 |
| 2003/0155336 A1* | 8/2003 | Kreuter et al. ......... 219/121.76 |
| 2003/0219094 A1* | 11/2003 | Basting et al. ................ 378/34 |
| 2005/0031004 A1* | 2/2005 | Basting et al. ................ 372/57 |
| 2005/0281306 A1* | 12/2005 | Nakao et al. .................. 372/55 |

OTHER PUBLICATIONS

Paetzel, Rainer, "Comparison Excimer Laser- Solid State Laser," Goettingen, Germany, Date Unknown, 10 pages.

Patzel, et al., "The New Generation of Excimer Lasers for SubquarterMicron Lithography," Gottingen, Germany, Date Unknown, 11 pages.

* cited by examiner

METHOD AND APPARATUS TO INCREASE THROUGHPUT OF PROCESSING USING PULSED RADIATION SOURCES

BACKGROUND OF THE INVENTION

1. Field of the Invention

The present invention relates to material processing using pulsed radiation sources. More specifically, it relates to lithography systems using excimer lasers.

2. Description of Related Art

Excimer lasers and other pulsed radiation sources are used in various applications, such as lithographic systems for semiconductor wafer scanners, amorphous silicon annealing for Thin Film Transistor (TFT) processes, and ablation processes for silicon and other materials.

In semiconductor processing, the continual shrink in feature sizes has placed increased pressure on systems to reproduce these smaller features. For example, in lithography the size of features that can be imaged on a semiconductor wafer is often defined as the critical dimension achievable by radiation exposing through a mask (i.e., reticle) and onto a target surface. The critical dimension is governed by many factors; however, one of the dominant factors limiting small critical dimensions is the wavelength of the radiation used to expose the surface. To achieve the lower required wavelengths, lithography systems have turned away from visible light to the smaller wavelengths of ultraviolet radiation produced by excimer lasers. Excimer lasers (excimer stands for excited dimmer) are gas-based lasers comprised of inert and halide gases that generate intense, short, radiation pulses. The halide gas may typically be Fluorine. Various other, typically inert, gases may be used in combination with the Fluorine to produce different wavelengths of ultraviolet light. Some example gases for combination are: Krypton, to produce a 248 nm wavelength; Argon, to produce a 193 nm wavelength; and Fluorine, to produce a 157 nm wavelength. These excimer lasers are generally referred to as KrF lasers, ArF lasers and F2 lasers, respectively.

In generating the necessary power and wavelength, these various excimer lasers undergo a charge/discharge cycle. In this cycle, the laser consumes a relatively constant energy supply, which is stored up until a desired amount of energy is reached. A short pulse in a discharge chamber containing the gases discharges this desired energy, generating a short intense pulse of laser radiation. This charge/discharge cycle results in a maximum frequency at which the excimer laser may operate. Typical maximum frequencies (i.e., pulse rates) are one kilohertz for traditional excimer lasers, two kilohertz for newer excimer lasers, and four kilohertz for emerging technology lasers.

The low spatial coherence of an excimer laser enables illumination of a relatively large area, typically in the form of a rectangular shaped beam. Generally, this rectangular beam may be scanned in one direction across the material to be processed, and then stepped to a new location where the scanning is repeated. An apparatus, typically referred to as a stepper/scanner, performs this process. For example, in a lithography application the stepper/scanner typically scans a rectangular beam across a mask, exposing a photosensitive resist on the surface of a semiconductor wafer at one semiconductor die location. This scanning process may comprise lateral movement of a portion of the scanner apparatus containing the mask and semiconductor wafer such that the mask and semiconductor wafer effectively scan under the stationary beam. In other scanning processes the stepper/scanner, may laterally move the mask in one direction, while moving the semiconductor wafer in an opposite direction, creating an enhanced scanning rate. After scanning a semiconductor die location, the stepper/scanner steps to a new semiconductor die location to repeat the scanning process.

Depending upon the application, any given area of the material may need to be irradiated by as many as hundreds or even thousands of laser pulses as the material is scanned. Because the maximum frequency of pulsed radiation sources is limited, the total throughput for exposing a material is limited. As a result, the total exposure time for the material is limited. Increasing the throughput of a lithography or ablation step in material processing reduces overall processing time and production costs. In order to reduce the overall total exposure time, a method and apparatus to increase the pulsed radiation exposure throughput is needed. Additionally, such an approach may extend the useful lifetime of existing technologies by increasing their throughput while also extending the throughput capabilities of the newest technologies.

BRIEF SUMMARY OF THE INVENTION

An embodiment of the present invention comprises a material processing system and method of operation. Some example processes and materials include: exposing amorphous silicon in an annealing process, with or without an intervening mask, such as for TFT processing; exposing a photoresist layer on a silicon wafer through a mask; and exposing a silicon wafer through a mask to perform a laser ablation process, such as for cutting contacts and vias. An exemplary embodiment comprises a first laser, at least one additional laser, and a beam aligner. The first laser may generate periodic pulses of radiation along a beam path segment directed at the target material. Similarly, the one or more additional lasers may generate periodic pulses. The beam aligner redirects the beam paths of each of the one or more additional lasers such that a final beam path segment of each of the one or more additional lasers may be directed at the target along a path substantially colinear with the beam path segment directed at the target from the first laser. As a result, all the lasers may be directed at the target along the same combined beam path.

An optical seed pulse may be generated or diverted from the periodic pulse of the first laser and redirected to an optical input on the one or more additional lasers. This optical seed pulse may be used to calibrate and perform fine adjustments on the wavelength of the radiation pulses from the one or more additional lasers such that they substantially match the wavelength of the optical seed pulse. Additionally, the optical seed pulse may be used to delay triggering of the periodic pulses from the one or more additional lasers. This delay allows for a series of pulses to impinge on the target from the combination of all the lasers' pulses, such that multiple pulses impinge on the target within a single charge/discharge cycle of any given laser.

Typically, the time delays are arranged such that the series of pulses, comprised of pulses from all the lasers, on the combined beam path are substantially non-overlapping and all pulses for a given pulse period occur before the beginning of the next pulse period.

In another exemplary embodiment of the invention a controller, rather than the optical seed pulse, may be used to accomplish the time delay between pulses from each of the lasers. The controller may receive a trigger signal from the first laser on a communication bus. After the desired time delay for each of the additional lasers, the controller initiates a trigger signal on the communication bus to each of the additional lasers.

In another exemplary embodiment of the invention, the controller may still be used to control the time delay between pulses from each of the lasers. However, in this embodiment, the controller may program the desired time delay into each of the additional lasers, while the trigger signal may be carried along the communication bus to each of the additional lasers. Each additional laser may receive the trigger signal at the same time, but initiates its pulse after the desired time delay.

The exemplary embodiments may comprise beam controllers for beam shaping and dose sensing of each laser separately. The beam shaping may include various elements for adjusting parameters of the beam such as lenses, filters, mirrors, homogenizers, and aperture controllers. The dose sensor may measure the radiation pulse intensity of any given pulse. This measured intensity may be used to control the intensity of subsequent pulses to generate an average desired dose intensity over a series of pulses.

In other embodiments, there may be a single beam controller in the combined beam path. In this combined beam controller configuration, a dose sensor in the beam controller may sense pulse intensity for pulses from each of the lasers and generate a feedback signal to all of the lasers to control pulse intensity of subsequent pulses from all the lasers.

BRIEF DESCRIPTION OF THE DRAWINGS

In the drawings, which illustrate what is currently considered to be the best mode for carrying out the invention.

DETAILED DESCRIPTION OF THE INVENTION

In the following description of exemplary embodiments of the present invention, a pulsed radiation source 120 may comprise an excimer laser. This excimer laser may be a laser light source, such as, for example, KrF (248 nm wavelength), ArF (193 nm wavelength), and F2 (157 nm wavelength). Additionally, the present invention may be practiced with other pulsed radiation sources 120, such as, for example, harmonic generators using larger wavelength lasers in combination to produce a shorter wavelength beam, metal vapor lasers, diode pumped solid state lasers, and extreme ultraviolet beam generators, such as X-rays. Signals referred to in this description may travel on and refer to a variety of embodiments, such as a single conductor, a serial communication bus, a parallel communication bus, and electromagnetic radiation, such as a Radio Frequency (RF) signal.

Figure 1:
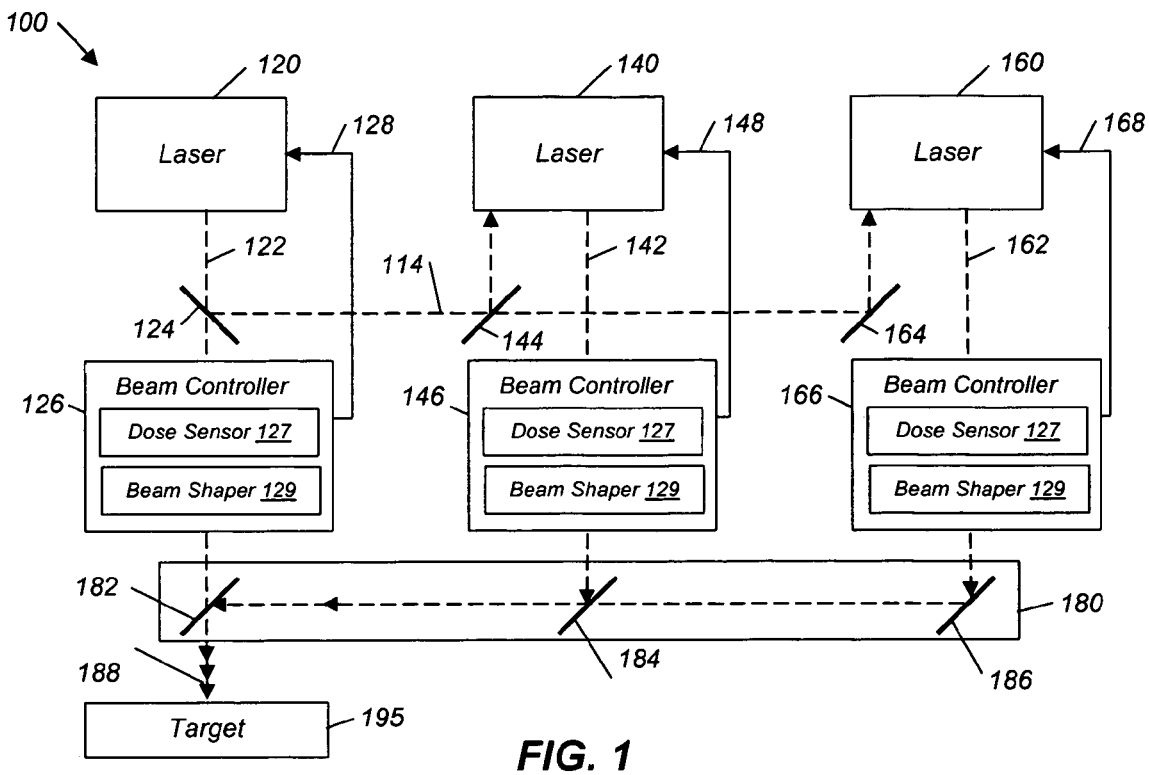
FIG. 1 is a schematic representation of a material processing system according to an exemplary embodiment of the present invention.

FIG. 1 illustrates an exemplary embodiment of the present invention. A pulsed radiation source 120 (also referred to as a first laser 120) is configured to generate a pulsed laser beam, which follows a first beam path 122 (the figures show all beam paths as broken lines). The first beam path 122 may be directed through a first beam controller 126 before impinging upon a target 195. FIG. 1 shows the first beam path 122 as a straight line between the first laser 120 and the target 195. However, in practice, the actual first beam path 122 may be redirected multiple times, for various reasons, such as, for example, to accommodate physical locations of the various elements in the first beam path 122, such as the first laser 120, the first beam controller 126, and the target 195. These redirections may typically be accomplished using mirrors, as is well known in the art.

Two additional pulsed radiation sources (140 and 160) are respectively shown as a second laser 140 and a third laser 160. A second beam path 142 originates from the second laser 140 and may be directed through a second beam controller 146 before entering the beam aligner 180. Similarly, a third beam path 162 originates from the third laser 160 and may be directed through a third beam controller 166 before entering the beam aligner 180. As with the first beam path 122, the second beam path 142 and third beam path 162 may be redirected multiple times before entering the beam aligner 180 for the same reasons stated with respect to the first beam path 122.

In the exemplary embodiment shown in FIG. 1, the beam aligner 180 comprises at least a combining redirector 182, a second redirector 184, and a third redirector 186. Typically, redirectors are mirrors well known in the art. However, the redirectors may also be beam splitters, wherein the beam splitter reflects a portion of the beam while a portion of the beam transmits directly through the beam splitter with no directional change. The path of the second laser 140 is redirected by the second redirector 184 and the combining redirector 182 to be substantially colinear with the beam path from the first laser 120 along a beam path segment referred to as a combined beam path 188. Similarly, the path of the third laser 160 is redirected by the third redirector 186 and the combining redirector 182 to be substantially colinear with the combined beam path 188. Additionally, while not shown in the drawings, the beam paths within the beam aligner 180 may undergo various other redirections for the convenience of physical layout. As a result, while the lasers may have various beam paths broken into beam segments between redirectors, the final beam segment exiting the beam aligner 180 contains a final beam segment from each of the first laser 120, the second laser 140, and the third laser 160. This combined beam path 188, including the substantially colinear beam paths from all the lasers (120, 140, and 160), may include additional redirections between the beam aligner 180 and the target 195. Typically, an electro-mechanical positioning system (not shown) may move the redirectors (182, 184, and 186) into proper position and angle for generating the combined beam path 188.

Further, for the convenience of drawings and explanation, the beam aligner 180 is shown as a single unit. However, the beam aligner 180 may be thought of as a virtual module wherein all the functions are not necessarily collected in a single identifiable location. In other words, the beam aligner 180 may be thought of as the collective components used in the function of redirecting and aligning the beam paths from the various lasers into a combined beam path 188 for directing at a target 195. Additionally, the combining redirector 182 may be more than a single simple mirror. For example, the combining redirector 182 may comprise a mulitfaceted mirror for redirecting the first, second, and third beams into the combined beam path 188. Alternatively, the combining redirector 182 may comprise multiple mirror elements, which redirect the first, second, and third beams into the combined beam path 188.

The target 195 may be any of a number of apparatus and/or items. For example, the target 195 may be a semiconductor die assembly carried by a lithography system using a stepper/scanner apparatus for exposing the semiconductor die bearing a photosensitive resist material to radiation through a mask. Another suitable target 195 is amorphous silicon in a TFT annealing process. Various other targets 195 are contemplated, such as a silicon substrate to be subjected to an ablation process for drilling via and contact holes therein. Other materials for the target 195 and processes using a pulsed radiation source 120 are contemplated as within the scope of this invention. The exemplary embodiments, without limiting the scope of the invention, refer primarily to lithography systems.

The beam controllers (126, 146, and 166) may comprise multiple functional elements. For example, a material processing system 100 may include dose sensors 127 and beam shapers 129. Beam shapers 129 may comprise various optical components. An aperture controller may be used to define how much of the beam may actually reach the target 195, particularly around the edges of the beam where the beam energy may be reduced or non-uniform. Beam homogenizers may be used to improve the spatial uniformity of the beam. Various lenses and filters may be required for focusing and reshaping the beam profile. Additionally, polarizers may be employed to control the orientation of a beam directed at the target 195, or beams directed at various other components, such as an optical seed pulse beam 114 (explained more fully below).

Typically, a dose sensor 127 may be employed to measure the total energy of any given pulse as it exists at the location of the dose sensor 127. This may be required to sense energy loss possibly incurred as an energy beam passes through the various optical elements in the beam path such as lenses, filters, mirrors, and polarizers. The dose sensor 127 may also detect energy differences of one pulse relative to another pulse. A feedback signal indicating a result of the dose sensor 127 measurement may be returned to a laser for adjustment of subsequent pulses such that a desired average dose intensity is achieved over a predetermined number of pulses from the laser. For the exemplary embodiment shown in FIG. 1, a first feedback signal 128 from the first beam controller 126 feeds back to the first laser 120. A second feedback signal 148 from the second beam controller 146 feeds back to the second laser 140. Finally, a third feedback signal 168 from the third beam controller 166 feeds back to the third laser 160. While the dose energy measurement of each pulse is performed in the beam controller, the averaging function and determination of energy level for subsequent pulses may be performed in the beam controller, the laser, or an intermediary processor (not shown in FIG. 1).

Also shown in FIG. 1 are an optical seed pulse beam 114 and various seed pulse redirectors (124, 144, 164). A first seed pulse redirector 124, is positioned in the first beam path 122 to redirect a portion of the pulsed radiation source 120 as an optical seed pulse beam 114. A second seed pulse redirector 144 is positioned to redirect the optical seed pulse beam 114 into an optional input of the second laser 140. A third seed pulse redirector 164 is positioned to redirect the optical seed pulse beam 114 into an optional input of the third laser 160. Typically, the first seed pulse redirector 124 may be a beam splitter with low reflectivity to permit most of the energy to pass through the seed pulse redirector along the first beam path 122 while only a small portion of the energy is diverted for redirection to the second laser 140 and the third laser 160.

The optical seed pulse beam 114 may be used for multiple functions. One such function is to control and calibrate the wavelength generated by the additional lasers (140 and 160). It may be desirable in the overall operation of material processing system 100 that the wavelength of all pulses impinging on the target 195 be of substantially the same wavelength. Feeding the optical seed pulse beam 114 generated from the first laser 120 into the additional lasers (140 and 160) may be used as a method of calibration. This calibration method allows the additional lasers (140 and 160) to make fine adjustments to the wavelength of the radiation generated by the additional lasers (140 and 160) to match the wavelength sensed at their optical inputs. Since the optical seed pulse beam 114 is derived from the first laser 120, the additional lasers (140 and 160) are configured to generate wavelengths substantially equal to that of the first laser 120.

Another function of the optical seed pulse beam 114 is to determine when the additional lasers (140 and 160) should trigger their periodic pulses. If equipped to do so, a laser may generate its pulse a predetermined delay time after sensing the optical seed pulse beam 114 at the optical input. As explained later, the trigger of each laser may be set to a different delay such that the combined beam path 188 comprises non-overlapping pulses from all the lasers (120, 140, and 160). In the embodiment shown in FIG. 1, the optical inputs of the additional lasers (140 and 160) are used for both wavelength calibration and pulse triggering.

Figure 2:
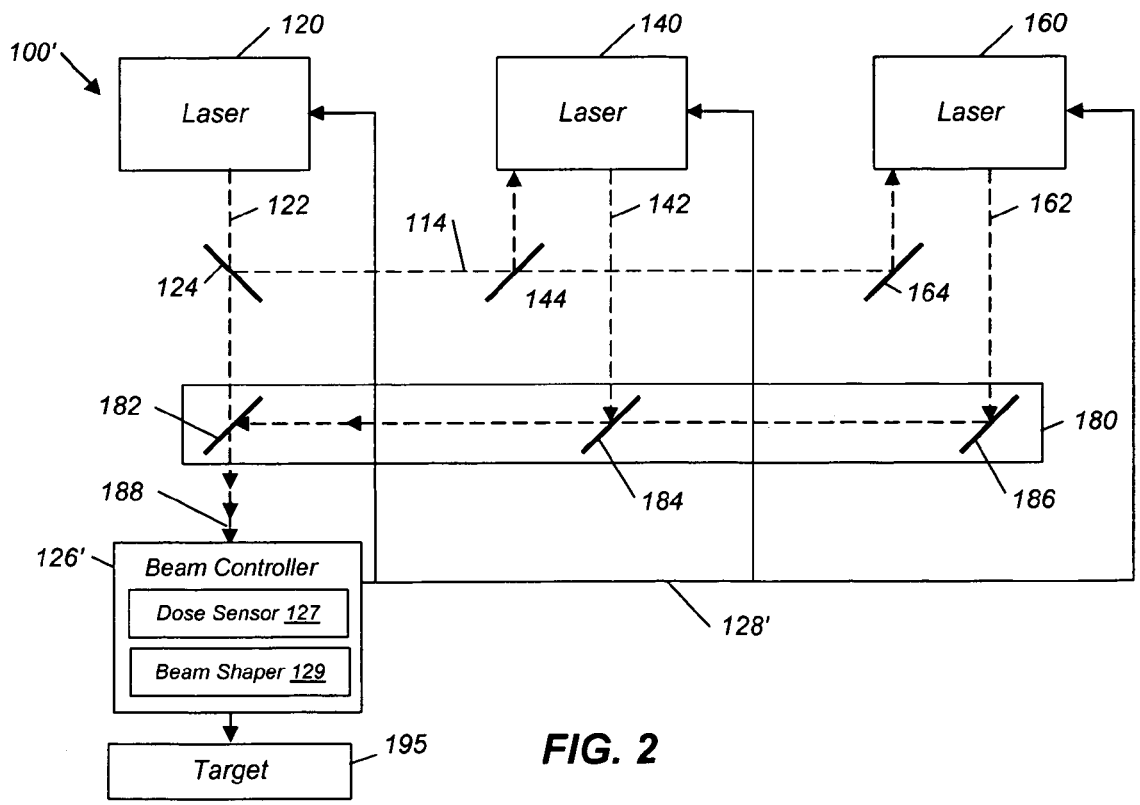
FIG. 2 is a schematic representation of a material processing system according to another exemplary embodiment of the present invention.
Figure 3:
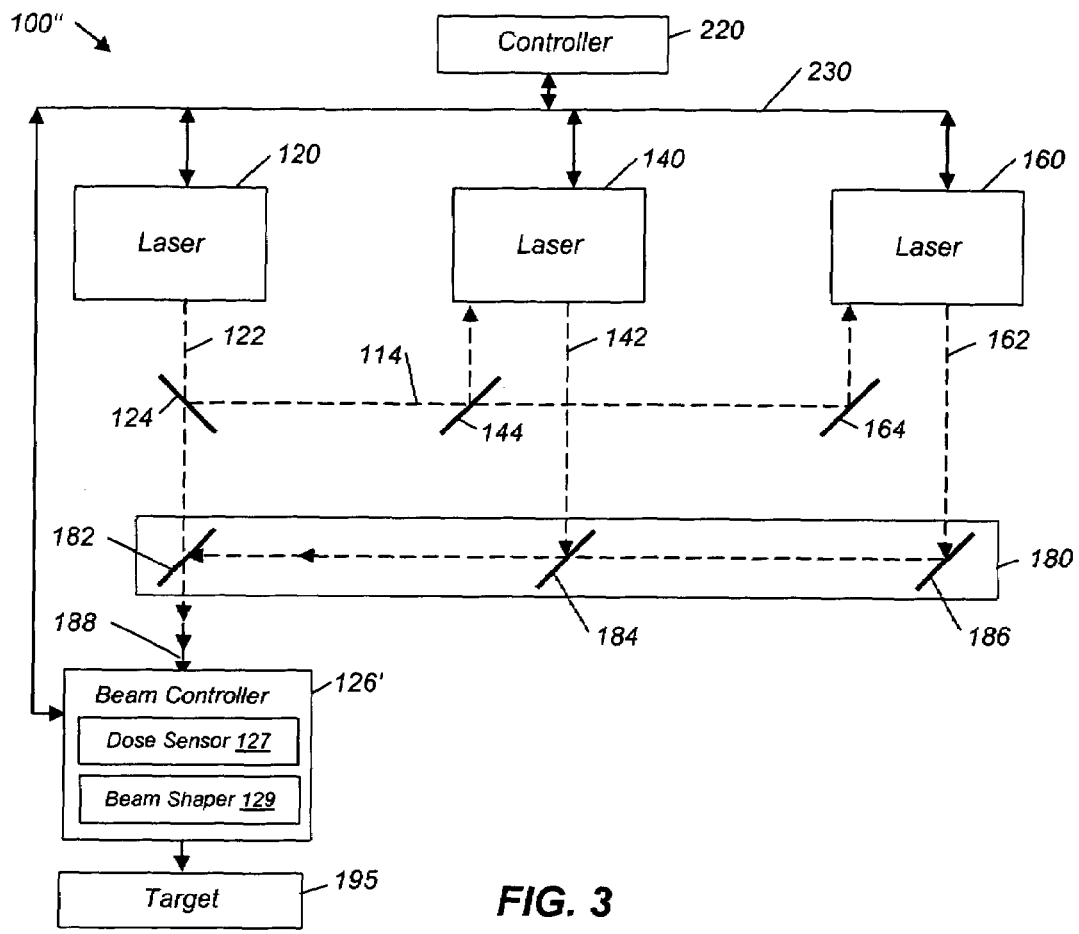
FIG. 3 is a schematic representation of a material processing system according to another exemplary embodiment of the present invention.

FIGS. 1, 2, and 3 illustrate exemplary embodiments of the present invention using three excimer lasers. Other configurations, such as those using two lasers or using more than three lasers, are within the scope of the present invention. There are however, limits to how many excimer lasers may be used. These limits are discussed more fully below. Of course, in the embodiment shown in FIGS. 1, 2, and 3, using more or fewer lasers may also entail the use of more or fewer beam controllers and redirectors.

Figure 4:
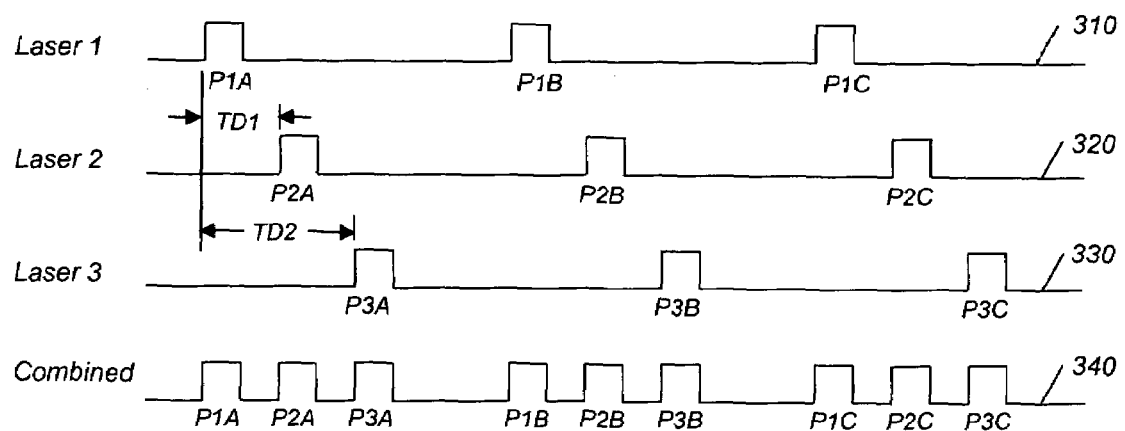
FIG. 4 is a timing diagram illustrating pulse rates according to an exemplary embodiment of the present invention.

FIG. 4 illustrates a timing diagram of periodic pulses (310, 320, and 330) respectively generated from the various lasers (120, 140, and 160) when there are three lasers used in the material processing system 100. Unless otherwise noted, a series of pulses are referred to as a periodic pulse, while an individual pulse within the series is referred to simply as a pulse. The frequency (i.e., pulse rate) of this periodic pulse may be varied depending on the type of material being exposed. The maximum frequency at which a single laser may be pulsed is defined by the technology and laser type. For present, commercial laser technologies, typical maximum frequencies may be one kilohertz or two kilohertz, while the newest developing technologies may have a maximum pulse rate as high as four kilohertz. Because an advantage of the present invention is to decrease overall processing time, the discussion generally focuses on maximizing pulse rates at the target. However, the present invention may produce enhanced pulse rate at the target while operating each of the lasers at less than the maximum pulse rate of the lasers. This may be desirable in systems, for example, where the pulse to pulse dose intensity of lasers at the maximum pulse rate may not be as tightly controlled as the pulse to pulse dose intensity at lower pulse rates.

In operation, the first laser 120 typically generates a first periodic pulse 310. Typically, the first periodic pulse 310 may be used as a master. The second periodic pulse 320 and the third periodic pulse 330 may be derived from and delayed from the first periodic pulse 310. The first periodic pulse 310 may be a train of individual pulses (P1A, P1B, and P1C). The second periodic pulse 320 may be a train of individual pulses (P2A, P2B, and P2C), which are each delayed from the individual pulses (P1A, P1B, P1C) of the first periodic pulse 310 by a predetermined first delay time TD1. The third periodic pulse 330 may be a train of individual pulses (P3A, P3B, and P3C), which are delayed from the individual pulses (P1A, P1B, P1C) of the first periodic pulse 310 by a predetermined second delay time TD2. The periodic pulses (310, 320, 330), emerge from the beam aligner 180 as a combined periodic pulse 340 for directing at the target 195 along the combined beam path 188. As a result, within one charge/discharge period of any single laser, three radiation pulses may be directed at the target 195. Due to the delay times (TD1 and TD2), these pulses may occur sequentially in time along the combined beam path 188, for example, P1A, followed by P2A, followed by P3A. If the lasers are set to periodically pulse, after the first charge/discharge period the second charge/discharge period may contain pulses Pi B, followed by P2B, followed by P3B. The pattern may be repeated for each desired subsequent charge/discharge period.

Typically, the delay times (TD1 and TD2) are chosen such that there is no overlap of pulses in the combined periodic pulse 340 while still ensuring that a pulse from each of the periodic pulses 310, 320, and 330 occurs within one period.

Obviously, a theoretical temporal limit to the number of lasers that may be time multiplexed in this manner exists. A typical laser may have a pulse duration of 10-50 nanoseconds. A one-kilohertz charge/discharge pulse rate allows for a 1,000 microsecond period. Even allowing for relatively large time delays (TDl and TD2) between triggering of additional laser pulses, there is plenty of time within a charge/discharge period to incorporate hundreds of lasers. However, more practical limits are imposed by system costs and energy absorption characteristics of the target 195 and the various optics involved.

An increased duty cycle (i.e., the amount of time a pulse of radiation is on versus the amount of time there is no radiation) means an increase in average energy on the optical components and target 195. Specifically with respect to target materials, the patterning material on masks, such as chrome or aluminum, may be sensitive to an increased average energy, which may cause damage to the mask.

FIG. 2 illustrates another exemplary embodiment of a material processing system 100'. In the FIG. 2 embodiment, the first beam controller 126, the second beam controller 146, and the third beam controller 166 are removed from the beam paths of the individual lasers prior to entering the beam aligner 180. This configuration allows a single first beam controller 126' to be configured for placement in the combined beam path 188. If the first beam controller 126' contains a dose sensor 127, a single first feedback signal 128' connects to all three lasers (120, 140, and 160) to control pulse intensity of subsequent pulses. This embodiment has the obvious cost and complexity advantage of using a single beam controller for managing beam shaping and dose control on the combined beam path 188 rather than each individual beam path. However, in this configuration, the components within the beam controller may be exposed to three times as much energy within any given charge/discharge period relative to the FIG. 1 embodiment.

FIG. 3 illustrates another exemplary embodiment of a material processing system 100". As with the FIG. 2 embodiment, in the FIG. 3 embodiment the first beam controller 126, the second beam controller 146, and the third beam controller 166, are removed from the individual beam paths in favor of a single beam controller 126' in the combined beam path 188. The FIG. 3 exemplary embodiment also contains a controller 220. The controller 220 may serve multiple functions. In a basic function the controller 220, rather than the optical seed pulse beam 114, manages the pulse delays from the additional lasers (140 and 160). The controller 220 receives a trigger signal on a communication bus 230 from the first laser 120. The trigger signal is delayed by the controller 220 for the respective desired time delays (TD1 and TD2) for each of the additional lasers (140 and 160) and asserts a signal on the communication bus 230 to each of the additional lasers (140 and 160) after the respective desired time delays (TD1 and TD2). In this exemplary embodiment, the optical seed pulse beam 114 is optional, and still may be used for wavelength calibration of the additional lasers (140 and 160).

Alternatively, the controller 220 and lasers (120, 140, and 160) may be configured such that the additional lasers (140 and 160) may generate their respective additional periodic pulses (320 and 330) at programmed time delays (TD1 and TD2) after receiving a trigger signal. In this case, the controller 220 may program the desired time delay (TD1 and TD2) into each of the additional lasers (140 and 160). The trigger signal may be carried along the communication bus 230 and connect to a communication input on each of the additional lasers (140 and 160). Each additional laser (140 and 160) may receive the trigger signal at the same time but wait to generate its pulse until expiration of the programmed time delay (TD1 and TD2).

Another function of the controller 220 shown in FIG. 3 may be to manage the dose control. In this optional function, the beam controller 126' may report results from the dose sensor 127 incorporated therein to the controller 220. The controller 220 may then determine dose intensities for subsequent pulses for each of the lasers (120, 140, and 160). The desired dose intensities may be communicated to the lasers across the communication bus 230. Of course, while not shown in FIG. 3, dose control may still be accomplished with direct feedback from multiple beam controllers to the lasers as shown by the feedback signals (128, 148, and 168) of FIG. 1. Alternatively, dose control may be accomplished with a direct feedback signal 128' from a single beam controller 126' to the lasers as shown in FIG. 2.

Figure 5:
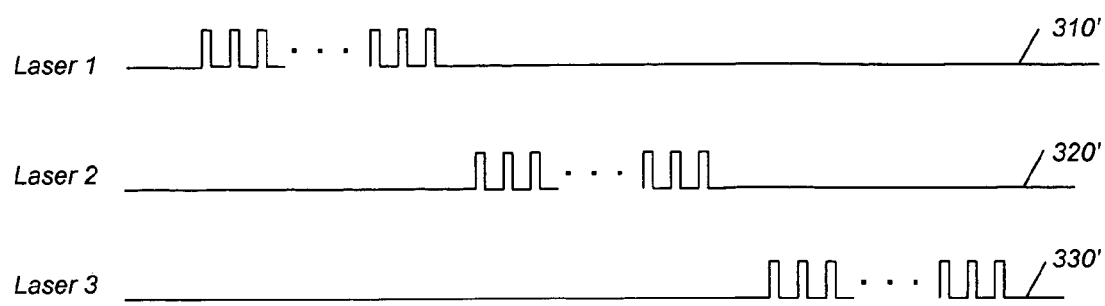
FIG. 5 is a timing diagram illustrating pulse rates according to another exemplary embodiment of the present invention.

FIG. 5 illustrates a timing diagram of the periodic pulses 310', 320', and 330' from the various lasers using an alternate timing mode. The timing mode depicted in FIG. 5 may be useful for applications such as ablation drilling of contact and via holes in the materials of various targets 195, such as, for example, silicon, glass, quartz, and PTFE. When drilling holes, and when ablating material in general, it may be advantageous to maintain the focal point of the laser very near the surface of the material at the point of ablation. As the material is ablated, the desired focal point moves down. As a result, it may be advantageous to modify the focal point parameters of the laser beam impinging on the material at different ablation depths. This modification may create smoother, more uniform, and vertical sidewalls of the feature being ablated. FIG. 5 illustrates a mode in which this change in focal depth may be accomplished without modifying focal point parameters of individual lasers and/or beam controllers during processing.

Figure 6:
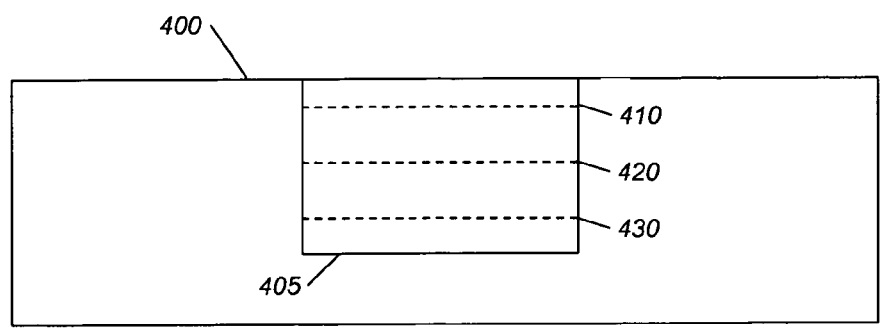
FIG. 6 is a cross section illustrating a target material and various focal depths that may be used in an ablation process.

FIG. 6 illustrates a cross section of a target material 400 with a portion ablated 405 and different focal depths (410, 420, and 430) that may be used in an ablation process. Using the material processing system 100 shown in FIG. 1 as an example, the first beam controller's 126 beam shaper 129 may set the beam from the first laser 120 at a first focal depth 410. The second beam controller's 146 beam shaper 129 may set the beam from the second laser 140 at a second focal depth 420. The third beam controller's 166 beam shaper 129 may set the beam from the third laser 160 at a third focal depth 430.

In operation, as shown in FIG. 5, the lasers (120, 140, and 160) are operated in sequence rather than time multiplexed. The first laser 120 generates a series of pulses 310' to ablate the material to a first depth 410. Next, the second laser 140, with its somewhat lower second focal depth 420, generates a series of pulses 320' to ablate the material to a second depth. Finally, the third laser 160, with its third focal depth 430 somewhat lower than the second focal depth 420 of the second laser 140, generates a series of pulses 330' to ablate the material to a third depth.

Although this invention has been described with reference to particular embodiments, the invention is not limited to these described embodiments. Rather, the invention is limited only by the appended claims, which include within their scope all equivalent devices or methods that operate according to the principles of the invention as described.

What is claimed is:

1. A material processing system, comprising:
   a pulsed radiation source configured for generating a periodic pulse having a beam path segment directed toward a target and configured to generate an optical seed pulse;
   at least one additional pulsed radiation source having an optical input for receiving the optical seed pulse, the at least one additional pulsed radiation source being configured to generate an additional periodic pulse at a time delay from the optical seed pulse; and
   a beam aligner configured for redirecting a beam path segment of the at least one additional pulsed radiation source to be substantially colinear with the beam path segment of the pulsed radiation source.

2. The system of claim 1, wherein the pulsed radiation source and the at least one additional pulsed radiation source are excimer lasers.

3. The system of claim 2, wherein the excimer lasers are selected from the group consisting of ArF, Kr, and F2 lasers.

4. The system of claim 1, wherein the pulsed radiation source is configured to generate the optical seed pulse from at least a portion of the periodic pulse and redirect the optical seed pulse to the optical input of the at least one additional pulsed radiation source.

5. The system of claim 4, wherein the at least one additional pulsed radiation source is configured to adjust a wavelength of the additional periodic pulse to substantially match a wavelength of the optical seed pulse.

6. The system of claim 1, wherein the time delay is of a magnitude that the additional periodic pulse from the at least one additional pulsed radiation source occurs before a next periodic pulse from the pulsed radiation source.

7. The system of claim 1, wherein the periodic pulse from the pulsed radiation source and the additional periodic pulse from the at least one additional pulsed radiation sources are substantially non-overlapping.

8. The system of claim 1, wherein the periodic pulse comprises a single pulse and the additional periodic pulse comprises a single pulse.

9. The system of claim 1, wherein the target is selected from the group consisting of amorphous silicon, a mask disposed over amorphous silicon, a mask disposed over a silicon wafer, and a mask disposed over a silicon wafer bearing a photoresist layer.

10. The system of claim 1, wherein the target is a step-and-scan apparatus bearing a material selected from the group consisting of amorphous silicon, a mask disposed over amorphous silicon, a mask disposed over a silicon wafer, and a mask disposed over a silicon wafer bearing a photoresist layer.

11. The system of claim 1, further comprising a beam controller comprising a dose sensor for measuring radiation pulse intensity of the pulsed radiation source and generating a feedback signal to the pulsed radiation source to control pulse intensity therefrom, for developing an average desired dose intensity for the pulsed radiation source.

12. The system of claim 11, wherein the beam controller further comprises a beam shaper comprising optical components for modifying beam properties.

13. The system of claim 11, further comprising at least one additional beam controller comprising a dose sensor for measuring radiation pulse intensity of the at least one additional pulsed radiation source and generating at least one additional feedback signal to the at least one additional pulsed radiation source, to control pulse intensity therefrom, for developing an average desired dose intensity for the at least one additional pulsed radiation source.

14. The system of claim 13, wherein the at least one additional beam controller further comprises a beam shaper comprising optical components for modifying beam properties.

15. The system of claim 1, further comprising a beam controller comprising a dose sensor for measuring radiation pulse intensity of all pulsed radiation sources comprising the pulsed radiation source and the at least one additional pulsed radiation source, and generating a feedback signal to all pulsed radiation sources, to control pulse intensity therefrom, for developing an average desired dose intensity for all pulsed radiation sources.

16. The system of claim 15, wherein the beam controller further comprises a beam shaper comprising optical components for modifying beam properties.

17. The system of claim 1, wherein the at least one additional pulsed radiation source comprises a plurality of radiation sources.

18. A material processing system, comprising:
   a pulsed radiation source configured for generating a periodic pulse having a beam path segment directed toward a target and configured to generate a trigger signal;
   at least one additional pulsed radiation source having a trigger input for receiving the trigger signal, the at least one additional pulsed radiation source being configured to generate an additional periodic pulse at a time delay from the trigger signal;
   a beam aligner configured for redirecting a beam path segment of the at least one additional pulsed radiation source to be substantially colinear with the beam path segment of the pulsed radiation source; and
   a controller operably coupled to the at least one additional pulsed radiation source and configured to program the time delay.

19. The system of claim 18, wherein the pulsed radiation source and the at least one additional pulsed radiation source are excimer lasers.

20. The system of claim 19, wherein the excimer lasers are selected from the group consisting of ArF, Kr, and F2 lasers.

21. The system of claim 18, wherein the pulsed radiation source is configured to emit an optical seed pulse redirected from the periodic pulse to an optical input on the at least one additional pulsed radiation source.

22. The system of claim 21, wherein the at least one additional pulsed radiation source is configured to adjust a wavelength of the additional periodic pulse to substantially match a wavelength of the optical seed pulse.

23. The system of claim 18, wherein the time delay is of a magnitude that an additional periodic pulse from the at least one additional pulsed radiation source occurs before a next periodic pulse from the pulsed radiation source.

24. The system of claim 18, wherein the periodic pulse from the pulsed radiation source and the additional periodic pulse from the at least one additional pulsed radiation source are substantially non-overlapping.

25. The system of claim 18, wherein the periodic pulse comprises a single pulse and the additional periodic pulse comprises a single pulse.

26. The system of claim 18, wherein the target is selected from the group consisting of amorphous silicon, a mask disposed over amorphous silicon, a mask disposed over a silicon wafer, and a mask disposed over a silicon wafer bearing a photoresist layer.

27. The system of claim 18, wherein the target is a step-and-scan apparatus bearing a material selected from the group consisting of amorphous silicon, a mask disposed over amorphous silicon, a mask disposed over a silicon wafer, and a mask disposed over a silicon wafer bearing a photoresist layer.

28. The system of claim 18, further comprising a beam controller comprising a dose sensor for measuring radiation pulse intensity of the pulsed radiation source and generating a feedback signal to the pulsed radiation source to control pulse intensity therefrom, for developing an average desired dose intensity for the pulsed radiation source.

29. The system of claim 28, wherein the beam controller further comprises a beam shaper comprising optical components for modifying beam properties.

30. The system of claim 28, further comprising at least one additional beam controller comprising a dose sensor for measuring radiation pulse intensity of the at least one additional pulsed radiation source and generating at least one additional feedback signal to the at least one additional pulsed radiation source, to control pulse intensity therefrom, for developing an average desired dose intensity for the at least one additional pulsed radiation source.

31. The system of claim 30, wherein the at least one additional beam controller further comprises a beam shaper comprising optical components for modifying beam properties.

32. The system of claim 18, further comprising a beam controller comprising a dose sensor for measuring radiation pulse intensity of all pulsed radiation sources comprising the pulsed radiation source and the at least one additional pulsed radiation source, and generating a feedback signal to all pulsed radiation sources, to control pulse intensity therefrom, for developing an average desired dose intensity for all pulsed radiation sources.

33. The system of claim 32, wherein the beam controller further comprises a beam shaper comprising optical components for modifying beam properties.

34. The system of claim 18, wherein the at least one additional pulsed radiation source comprises a plurality of radiation sources.

35. A material processing system, comprising:
a pulsed radiation source configured for generating a periodic pulse having a beam path segment directed toward a target and configured to generate a trigger signal;
at least one additional pulsed radiation source having a trigger input for receiving the trigger signal, the at least one additional pulsed radiation source being configured to generate an additional periodic pulse at a time delay from the trigger signal;
a beam aligner configured for redirecting a beam path segment of the at least one additional pulsed radiation source to be substantially colinear with the beam path segment of the pulsed radiation source; and
a controller operably coupled to the trigger signal and a communication input of the at least one additional pulsed radiation source, wherein the controller is configured to signal the at least one additional pulsed radiation source to initiate the additional periodic pulse after a time delay from the trigger signal.

36. The system of claim 35, wherein the pulsed radiation source and the at least one additional pulsed radiation source are excimer lasers.

37. The system of claim 36, wherein the excimer lasers are selected from the group consisting of ArF, Kr, and F2 lasers.

38. The system of claim 35, wherein the pulsed radiation source is configured to emit an optical seed pulse redirected from the periodic pulse to an optical input on the at least one additional pulsed radiation source.

39. The system of claim 38, wherein the at least one additional pulsed radiation source is configured to adjust a wavelength of the additional periodic pulse to substantially match a wavelength of the optical seed pulse.

40. The system of claim 35, wherein the time delay is of a magnitude that an additional periodic pulse from the at least one additional pulsed radiation source occurs before a next periodic pulse from the pulsed radiation source.

41. The system of claim 35, wherein the periodic pulse from the pulsed radiation source and the additional periodic pulse from the at least one additional pulsed radiation source are substantially non-overlapping.

42. The system of claim 35, wherein the periodic pulse comprises a single pulse and the additional periodic pulse comprises a single pulse.

43. The system of claim 35, wherein the target is selected from the group consisting of amorphous silicon, a mask disposed over amorphous silicon, a mask disposed over a silicon wafer, and a mask disposed over a silicon wafer bearing a photoresist layer.

44. The system of claim 35, wherein the target is a step-and-scan apparatus bearing a material selected from the group consisting of amorphous silicon, a mask disposed over amorphous silicon, a mask disposed over a silicon wafer, and a mask disposed over a silicon wafer bearing a photoresist layer.

45. The system of claim 35, further comprising a beam controller comprising a dose sensor for measuring radiation pulse intensity of the pulsed radiation source and generating a feedback signal to the pulsed radiation source to control pulse intensity therefrom, for developing an average desired dose intensity for the pulsed radiation source.

46. The system of claim 45, wherein the beam controller further comprises a beam shaper comprising optical components for modifying beam properties.

47. The system of claim 45, further comprising at least one additional beam controller comprising a dose sensor for measuring radiation pulse intensity of the at least one additional pulsed radiation source and generating at least one additional feedback signal to the at least one additional pulsed radiation source, to control pulse intensity therefrom, for developing an average desired dose intensity for the at least one additional pulsed radiation source.

48. The system of claim 47, wherein the at least one additional beam controller further comprises a beam shaper comprising optical components for modifying beam properties.

49. The system of claim 35, further comprising a beam controller comprising a dose sensor for measuring radiation pulse intensity of all pulsed radiation sources comprising the pulsed radiation source and the at least one additional pulsed radiation source, and generating a feedback signal to all pulsed radiation sources, to control pulse intensity therefrom, for developing an average desired dose intensity for all pulsed radiation sources.

50. The system of claim 49, wherein the beam controller further comprises a beam shaper comprising optical components for modifying beam properties.

51. The system of claim 35, wherein the at least one additional pulsed radiation source comprises a plurality of radiation sources.

52. A method, comprising:
generating a periodic pulse having a pulse period from a pulsed radiation source, wherein the periodic pulse includes a beam path segment directed at a target and the pulsed radiaton source produces a triggering event;
triggering at least one additional periodic pulse from at least one additional pulsed radiation source at a time delay relative to the periodic pulse and in response to the triggering event;
programming the time delay of the at least one additional pulsed radiation source such that the at least one additional periodic pulse occurs at the time delay after the triggering event; and
redirecting a beam path segment of the at least one additional periodic pulse to be substantially colinear with the beam path segment of the periodic pulse directed at the target.

53. The method of claim 52, wherein the generating, triggering and redirecting are repeated for each pulse period.

54. The method of claim 52, further comprising generating the periodic pulse and the at least one additional periodic pulse using excimer lasers.

55. The method of claim 54, further comprising selecting the excimer lasers from the group consisting of ArF, Kr, and F2 lasers.

56. The method of claim 52, wherein the time delay is of a magnitude that the at least one additional periodic pulse from the at least one additional pulsed radiation source occurs before a next pulse from the pulsed radiation source.

57. The method of claim 56, wherein each periodic pulse from the pulsed radiation source and each additional periodic pulse from the at least one additional pulsed radiation source are substantially non-overlapping.

58. The method of claim 52, wherein the time delay is such that the at least one additional periodic pulse from the at least one additional pulsed radiation source occurs after completion of the periodic pulse from the pulsed radiation source.

59. The method of claim 58, wherein the at least one additional pulsed radiation source comprises a plurality of additional pulsed radiation sources configured in a sequence such that each of the plurality of additional pulsed radiation sources generates its additional periodic pulse after completion of an additional periodic pulse from a previous pulsed radiation source.

60. The method of claim 58, wherein the periodic pulses of all pulsed radiation sources comprising the pulsed radiation source and the at least one additional pulsed radiation source are substantially non-overlapping.

61. The method of claim 52, wherein the periodic pulse comprises a single pulse and the at least one additional periodic pulse comprises a single pulse.

62. The method of claim 52, wherein the triggering event comprises a trigger signal generated by the pulsed radiation source.

63. The method of claim 52, wherein the triggering further comprises:
generating a trigger signal as the triggering event from the pulsed radiation source; and
receiving the trigger signal at a communication input of the at least one additional pulsed radiation source after a time delay relative to the trigger signal.

64. The method of claim 52, further comprising:
measuring a radiation pulse intensity of the pulsed radiation source; and
adjusting a radiation pulse intensity of a subsequent periodic pulse from the pulsed radiation source responsive to the measured radiation pulse intensity.

65. The method of claim 64, further comprising:
measuring a radiation pulse intensity of the at least one additional pulsed radiation source; and
adjusting a radiation pulse intensity of a subsequent additional periodic pulse from the at least one additional pulsed radiation source responsive to the measured radiation pulse intensity of the at least one additional pulsed radiation source.

66. The method of claim 52, further comprising:
measuring a radiation pulse intensity of at least one of all pulsed radiation sources comprising the pulsed radiation source and the at least one additional pulsed radiation source; and
adjusting a radiation pulse intensity of a subsequent periodic pulse from at least one of all pulsed radiation sources responsive to the measured radiation pulse intensity.

67. A method, comprising:
generating a periodic pulse having a pulse period from a pulsed radiation source, wherein the periodic pulse includes a beam path segment directed at a target and the pulsed radiaton source produces a triggering event comprising an optical seed pulse generated by the pulsed radiation source;
triggering at least one additional periodic pulse from at least one additional pulsed radiation source at a time delay relative to the periodic pulse and in response to the triggering event; and
redirecting a beam path segment of the at least one additional periodic pulse to be substantially colinear with the beam path segment of the periodic pulse directed at the target.

* * * * *

UNITED STATES PATENT AND TRADEMARK OFFICE
CERTIFICATE OF CORRECTION

PATENT NO. : 7,282,666 B2  Page 1 of 1
APPLICATION NO. : 10/841857
DATED : October 16, 2007
INVENTOR(S) : Agarwal et al.

It is certified that error appears in the above-identified patent and that said Letters Patent is hereby corrected as shown below:

On the face page, in field (56), under "Other Publications", in column 2, line 1, delete "Duffy" and insert -- Duffey --, therefor.

On the face page, in field (57), under "Abstract", in column 2, line 8, before "laser," insert -- additional --.

In column 13, line 34, in Claim 52, delete "radiaton" and insert -- radiation --, therefor.

In column 14, line 55, in Claim 67, delete "radiaton" and insert -- radiation --, therefor.

Signed and Sealed this

Twenty-fifth Day of December, 2007

JON W. DUDAS
*Director of the United States Patent and Trademark Office*